Oct. 29, 1963 M. KRONENBERG ETAL 3,109,166

CHARACTER GENERATOR APPARATUS

Filed Oct. 26, 1959 8 Sheets-Sheet 1

INVENTORS.
MARVIN KRONENBERG &
JAMES KENNETH MOORE
BY
Brumbaugh, Free, Graves & Donohue
their ATTORNEYS.

Oct. 29, 1963 M. KRONENBERG ETAL 3,109,166

CHARACTER GENERATOR APPARATUS

Filed Oct. 26, 1959 8 Sheets-Sheet 2

INVENTORS.
MARTIN KRONENBERG &
JAMES KENNETH MOORE
BY
Brumbaugh, Free, Graves & Donohue
their ATTORNEYS INVENTORS.
MARVIN KRONENBERG &
JAMES KENNETH MOORE
BY
Brumbaugh, Free, Graves & Donohue
their ATTORNEYS.

INVENTORS.
MARVIN KRONENBERG &
JAMES KENNETH MOORE
BY
Brumbaugh, Free, Graves & Donohue
their ATTORNEYS.

CHARACTER GENERATOR APPARATUS

Filed Oct. 26, 1959 8 Sheets-Sheet 5

INVENTORS
MARVIN KRONENBERG &
JAMES KENNETH MOORE
BY
Brumbaugh, Free, Graves & Donohue
their ATTORNEYS INVENTORS.
MARVIN KRONENBERG &
JAMES KENNETH MOORE
BY
Brumbaugh, Free, Graves & Donohue
their ATTORNEYS.

INVENTORS.
MARVIN KRONENBERG &
JAMES KENNETH MOORE

BY

Brumbaugh, Free, Graves & Donohue their ATTORNEYS.

CHARACTER GENERATOR APPARATUS

Filed Oct. 26, 1959 8 Sheets-Sheet 8

INVENTORS
MARVIN KRONENBERG &
JAMES KENNETH MOORE
BY
Brumbaugh, Free, Graves & Donohue
their ATTORNEYS United States Patent Office 3,109,166
Patented Oct. 29, 1963

3,109,166
CHARACTER GENERATOR APPARATUS
Marvin Kronenberg and James Kenneth Moore, Stamford, Conn., assignors to Columbia Broadcasting System, Inc., New York, N.Y., a corporation of New York
Filed Oct. 26, 1959, Ser. No. 848,649
9 Claims. (Cl. 340—324)

This invention relates to electric signaling systems and, more particularly, to signaling systems for generating electric signals representing characters, i.e., any two dimensional symbols, and for converting such signals to reproductions of the characters.

In recent years, computer equipment has been designed that is capable of very high speeds of operation. However, the apparatus that has been devised for displaying or recording directly characters represented by the output of such computer equipment has not been entirely satisfactory for a variety of reasons.

It is an object of the invention to provide new and improved apparatus for converting electric character representing signals to reproductions of the characters, which apparatus is free from the deficiencies of the prior art devices.

Another object of the invention is to provide new and improved signal converting apparatus of the above character which utilizes solid state signal translating devices.

A further object of the invention is to provide new and improved signal converting apparatus of the above character which is capable of displaying selected characters on a screen.

The invention, in a preferred embodiment, includes at least one primary storage element or matrix which can generate a signal that is representative of a character or combination of characters. Means are provided for selecting a matrix and causing it to generate repetitively a signal which is fed to a secondary storage and converter element. The converter converts the signal from the matrix to a form that is suitable for controlling a scanner type display device such as a cathode ray tube, for example. The vertical and horizontal scan generators of the cathode ray tube are synchronized with the means for causing the matrix to generate a signal repetitively and with the secondary storage and converter element.

In operation, a matrix is selected either mechanically or electronically and the signals initiated by the matrix are fed to the display device. The display device may display either the same character repetitively or a succession of different characters. In the latter case, means may be provided for making a record of each of the characters in succession.

The invention may be better understood from the following detailed description of a representative embodiment taken in conjunction with the accompanying drawings in which.

For purposes of illustration, there will be described herein apparatus designed to generate only a single character, the letter A, on a display cathode ray tube. It will be understood, however, that any number of matrices may be added to the apparatus in a manner to be described hereinafter in order to display any other character or combination of characters desired.

In a preferred embodiment of the invention, a matrix is provided that includes a wire grid (FIG. 1) having a plurality of horizontal and vertical intersecting wires 10 and 11, respectively. At the intersections of the wires that correspond to the edges of a character to be displayed, in this case the letter "A," square hysteresis loop magnetic cores 12 are inserted in such a manner that they couple both a vertical and a horizontal wire.

Figure 1:
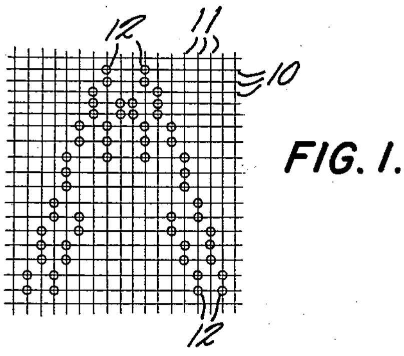
FIG. 1 is a schematic diagram of a matrix for a signal translating system constructed in accordance with the invention.

The rudimentary matrix shown in FIG. 1 has only 18 horizontal wires and 18 vertical wires or sense lines, and operates as follows: Initially all of the cores 12 are placed in their "one" state; thereafter, a readout pulse is passed through each of the horizontal wires 10 in succession. Current passing through a horizontal line causes the cores 12 on that line to go to their "zero" state which induces pulses on the sense lines 11 that also couple these cores. The sense lines on which the pulses appear will depend upon the geometrical disposition of the cores in the matrix. The excited sense lines are determined by a sampling element that samples each of the sense lines in succession by the use of a successively delayed pulse. It can be seen that if the vertical scan of a cathode ray tube is synchronized with the readout pulses on the horizontal lines and if the horizontal scan is synchronized with the sampling element, the apparatus can be made to generate a pattern on a cathode ray tube that is determined by the geometrical disposition of the cores if the pulses received from the sense lines are made to turn the beam of the tube on and off.

Figure 2:
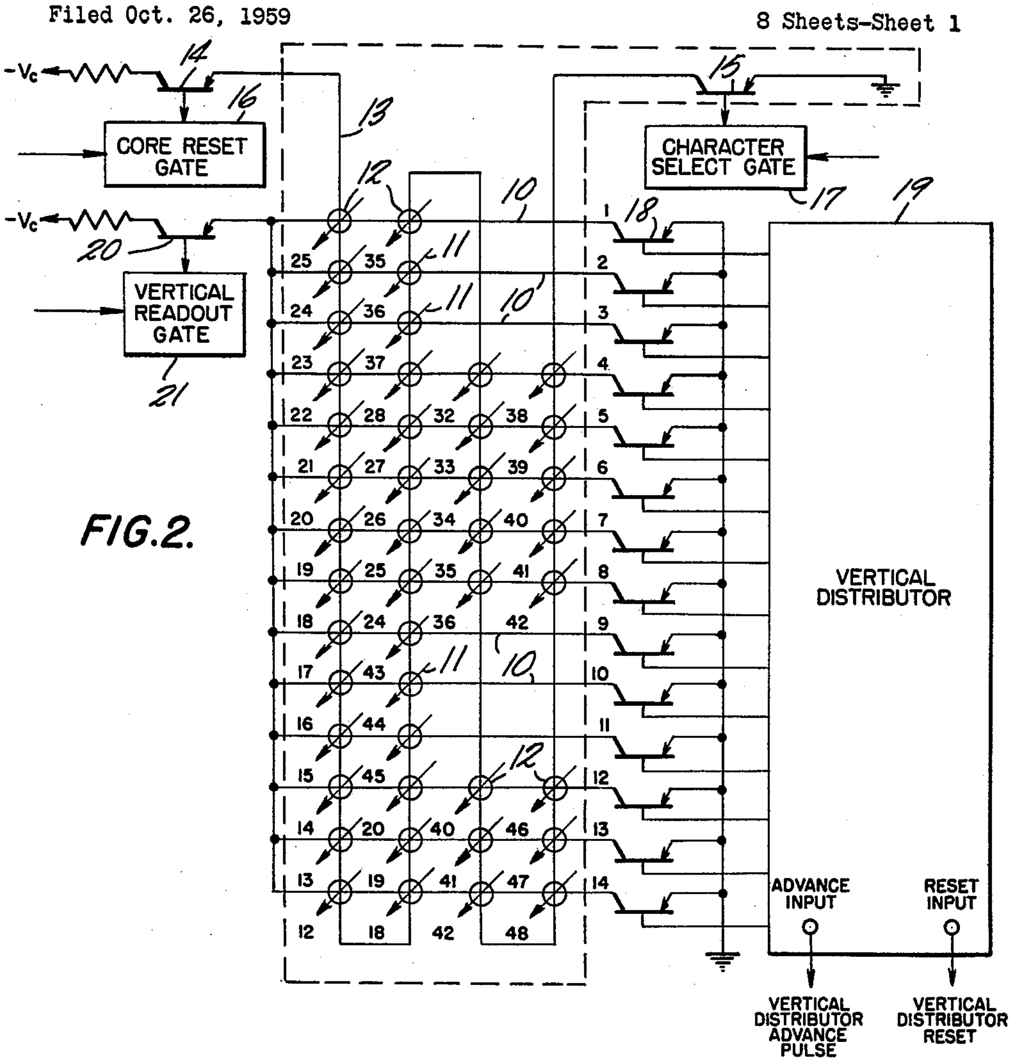
FIG. 2 is a detailed schematic diagram of the matrix shown in FIG. 1.
Figure 3:
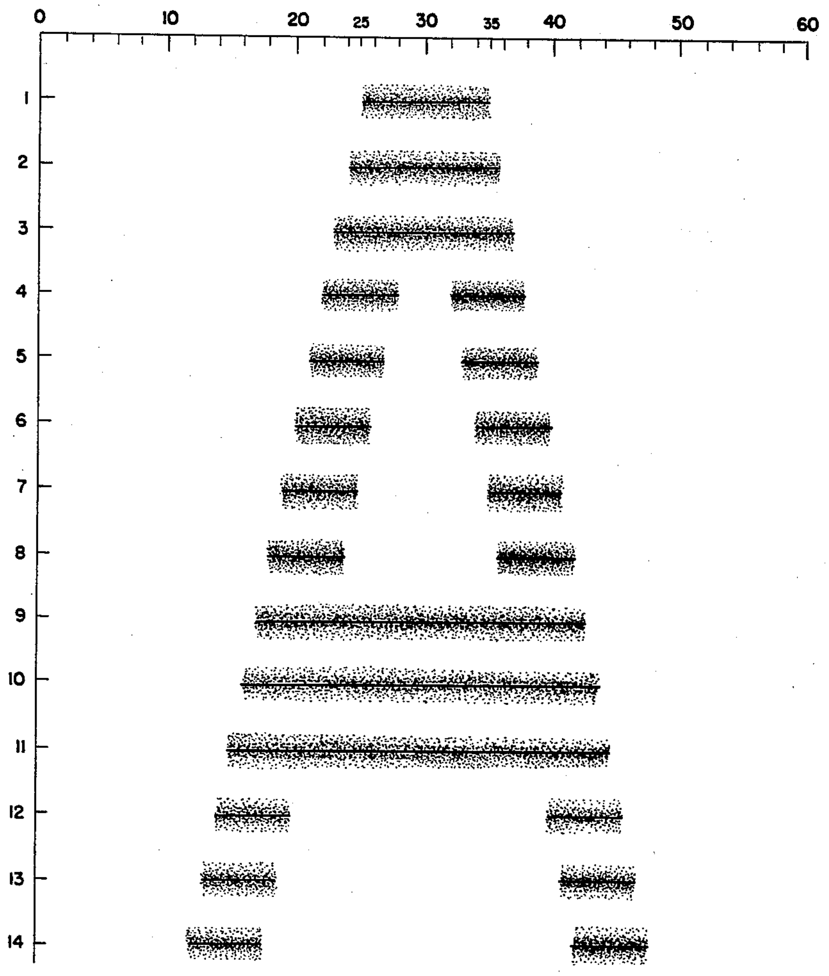
FIG. 3 is a typical representation of a character as it is displayed on a cathode ray tube.

The matrix illustrated in FIG. 2 is designed to generate the character "A" shown in FIG. 3 and it includes a greater number of sense lines 11 which provide greater horizontal resolution. With reference to FIG. 2, reset line 13 threads every core 12 in the matrix and is connected to the emitter and collector electrodes of the transistors 14 and 15, respectively. The base electrodes of these transistors are connected to a core reset gate circuit 16 and a character select gate circuit 17.

Each of the horizontal leads 10 in the matrix is connected to the collector electrode of one of fourteen transistors 18 which have their emitter electrodes grounded and their base electrodes connected to a vertical distributor device 19 to be described in detail later. The other end of each of the wires 10 is connected to the emitter electrode of a transistor 20 which has its base electrode connected to a vertical readout gate circuit 21.

In operation, all of the cores 12 in the matrix are placed in their "one" state by passing a pulse through the core reset gate 16 and the character select gate 17. This saturates the transistors 14 and 15 and allows current to flow through the transistors and the reset line 13. Thereafter, the transistors 18 are successively saturated by connecting them to a potential source in the vertical distributor 19. The vertical distributor 19 may include either a transistor flip-flop counter and decoding matrix or a magnetic beam switching tube which change their state and advance to the next transistor each time the distributor receives an advance pulse, or any of a wide class of shift registers.

Vertical readout pulses are passed through the gate 21 and saturate the transistor 20 each time one of the transistors 18 is saturated so that current flows through successive ones of the horizontal leads 10. As previously stated, this action causes pulses to appear on the sense lines 11 that thread the cores on the horizontal wire that is being readout. For example, when the first horizontal wire is being readout, pulses appear on sense lines 25 and 35; when the fifth horizontal wire is being readout, pulses appear on sense lines 21, 27, 33 and 39; etc. These pulses appearing on the sense lines are then fed into a secondary storage and converter (to be described) which converts these pulses into a form that is suitable for controlling the beam of a cathode ray tube.

Figure 4:
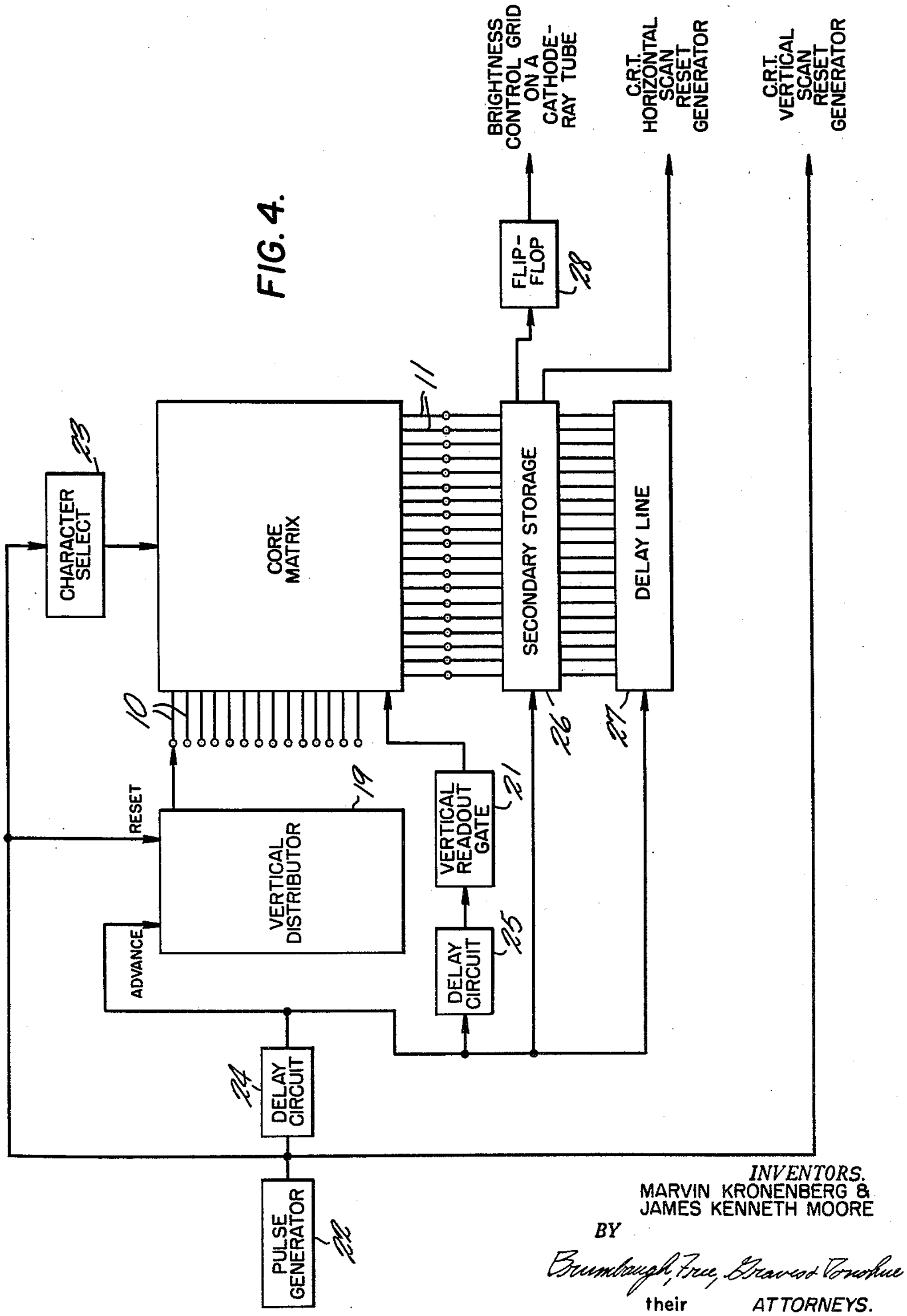
FIG. 4 is a block diagram of a character displaying system according to the invention.

FIG. 4 is a block diagram of an entire data display system which includes the matrix and the vertical distributor device shown in FIG. 2. A pulse generator 22 periodically generates pulses which are fed without delay to a character selector 23 that includes the transistor 14 and the gates 16 and 17 shown in FIG. 2. The sequence of events to be described may be followed more closely if reference is also made to FIGS. 7 and 8. Each output pulse from the generator 22 places all of the cores 12 in their "one" state and also places the vertical distributor 19 in its reset position.

Each pulse from the pulse generator 22 after being delayed by a delay circuit 24 also advances the vertical distributor 19 to the first of the horizontal wires 10, which is the position shown in FIG. 4. The pulse from the delay circuit 24 is also fed through another delay circuit 25 and to the vertical readout gate 21 which saturates the transistor 20 shown in FIG. 2. This causes current to flow through the transistor 20 and the horizontal wire 10 to which the vertical distributor 19 is connected which in turn causes pulses to appear on the two sense lines 25 and 35 simultaneously.

These pulses are fed in parallel into a secondary storage 26 that contains a plurality of storage elements 29 (FIG. 5) which are connected to each of the sense lines 11. After the sense line pulses have set certain of the storage elements, an intermediate storage readout pulse is received by a tapped delay line 27 which samples each of the storage elements in series. Each time one of the storage elements that has been set is sampled, a flip-flop circuit 28 has its state complemented or reversed.

The flip-flop circuit 28 produces a series of rectangular pulses which are fed to the brightness control grid on a display device such as a cathode ray tube and turn the cathode ray beam on and off at points that correspond to the location of the cores in the matrix. The vertical scan reset of the cathode ray tube is also connected to the output of the pulse generator 22 so that the vertical scan generator is synchronized with the position of the vertical distributor 19, and the horizontal scan reset is connected to the secondary storage 26 in such a manner that the horizontal scan generator is synchronized with the intermediate storage readout pulse as it samples the storage elements.

Figure 5:
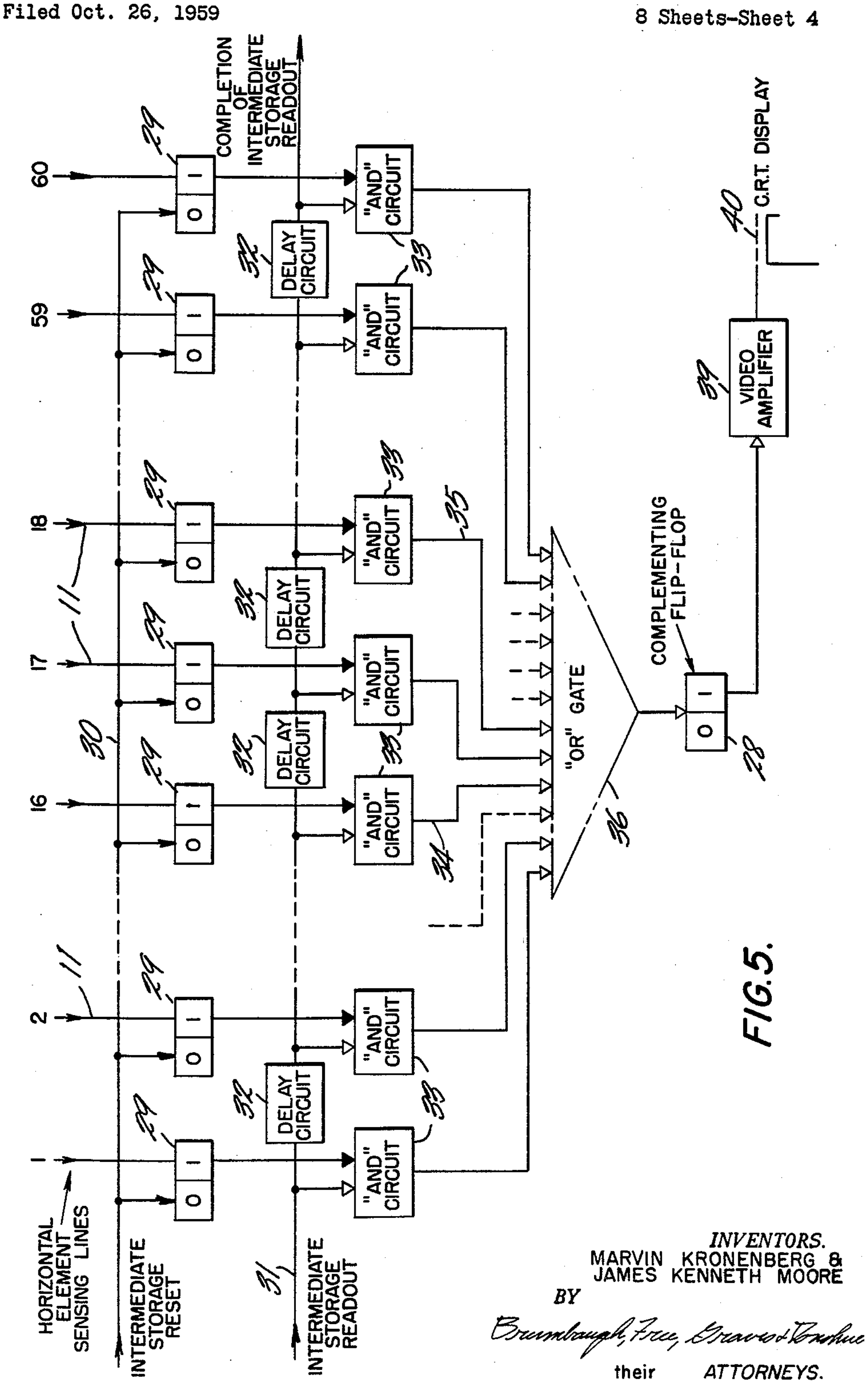
FIG. 5 is a block logic diagram of a portion of the system shown in FIG. 4.
Figure 6:
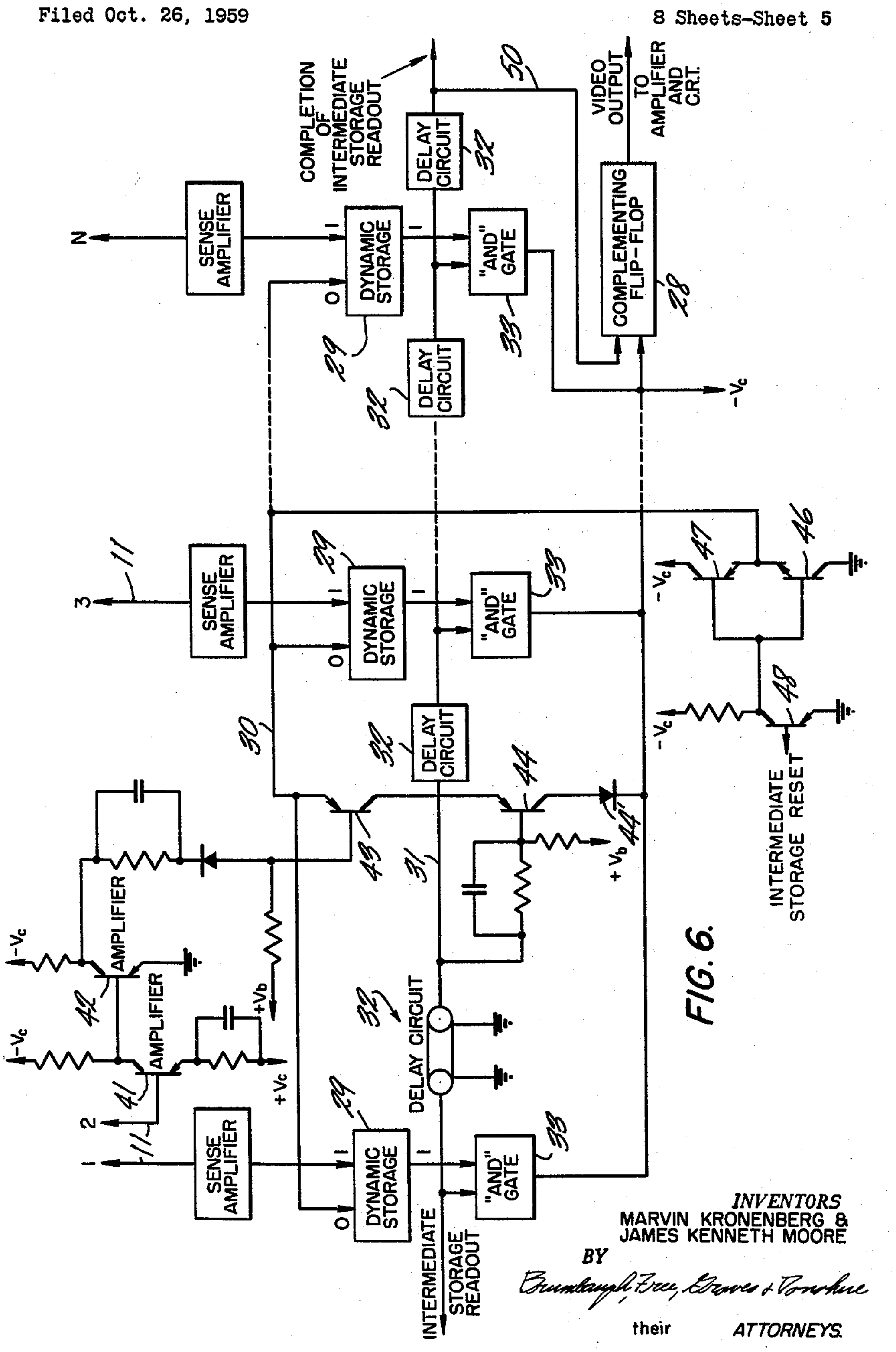
FIG. 6 is a schematic diagram of a portion of the system shown in FIG. 4.

The secondary storage 26, the delay line 27 and the flip-flop circuit 28 are shown in greater detail in FIGS. 5 and 6. Each of the sense lines 11 are connected to storage elements 29 which may be set-reset flip-flop circuits. These storage elements 29 are initially in their "zero" state by virtue of a pulse received on an intermediate storage reset line 30, and they transfer to their "one" state when a pulse appears on the sense line to which they are connected. The storage elements 29 and an intermediate storage readout line 31 are connected to a plurality of "and" circuits 33 and the line 31 is connected to a plurality of delay circuits 32 equivalent to a tapped delay line. When a readout pulse appears on the line 31, it samples each of the "and" circuits 33 in succession with the length of time between the sampling of each one being determined by the delay circuits 32.

Assuming that pulses have appeared on two sense lines such as the lines 16 and 18, a pulse will appear on the line 34 when the readout pulse on the line 31 reaches the "and" circuit to which it is connected and, a short time later, a pulse will appear on the line 35 after the readout pulse has passed through two more delay circuits. Each of the lines 34 and 35 is connected to an "or" gate 36 which passes both of the pulses to the flip-flop circuit 28.

The flip-flop circuit 28 will be turned on when the pulse on the line 34 appears and will be turned off when the pulse on the line 35 appears. The output of the flip-flop circuit 28 is a square wave which is amplified by a video amplifier 39 and is connected to the brightness control grid 40 of a display cathode ray tube.

It can be seen that if the horizontal sweep of the cathode ray tube is synchronized with the readout pulse traveling along the line 31, the beam of the cathode ray tube can be turned on and off at instants which correspond to the times when the storage elements 29 are being sampled. Since these times are directly related to the geometrical disposition of the magnetic cores in the matrix, a two dimensional character can be displayed on the cathode ray tube as shown in FIG. 3, by properly arranging the cores and by synchronizing the vertical position of the distributor 19 with the vertical scan on the cathode ray tube.

FIG. 6 illustrates schematically a portion of the circuit shown in FIG. 5. The circuit elements connected to the second sense line are shown in schematic form while the remainder of the elements are shown in block form. In operation, a pulse appearing on the second sense line will be amplified by two amplifier stages that include the two transistors 41 and 42. The amplified pulse is applied to the base electrode of a transistor 43 whose collector electrode is the reversed bias impedance of a transistor 44. The transistor 43 is driven well into saturation by the pulse and the parameters are chosen so that even under the worst conditions, the transistor 43 will remain saturated for the time required for a readout pulse on the line 31 to sample all of the storage elements.

The transistors 43 and 44 form the "and" circuit 33. If the transistor 43 is saturated when a readout pulse on the line 31 reaches the transistor 44, the collector electrode of the transistor 44 will drop to approximately ground potential and the high speed complementing flip-flop circuit 28 will be triggered. On the other hand, if the transistor 43 is not saturated, the potential on the collector electrode of the transistor 44 will not change and the flip-flop circuit 28 will not be triggered. Diodes 44' in series with the collectors of the transistors 44 form the decoupling "or" gate 36 of FIG. 5.

Connected to the intermediate storage reset line 30 are a pair of transistors 46 and 47 which are connected to a third transistor 48. Normally, the transistor 46 is biased on and the transistor 47 is biased off, thereby effectively grounding the emitter electrodes of the transistor 43 in the storage elements 29. When it is desired to reset the transistor 43 or, in other words, to clear the base region of stored minority carriers, the transistor 48 is tuned off by a pulse received on its base electrode. This action turns off the transistor 46 and turns on the transistor 47 which causes a large reverse current to be applied to the emitters of the saturated transistor 43 in the storage elements 29. Therefore, a pulse received on the base electrode of the transistor 48 will turn off the transistor 43 and hold all of the storage elements 29 off.

It can be seen that by properly adjusting the system timing these transistors may be held clamped off during the period in which noise pulses are being generated on the sense lines. This corresponds functionally to a "strobe" sampling which is common in coincidence current memories and results in usable signal-to-noise ratios with available magnetic cores.

The complementing flip-flop circuit 28 also receives signals along the line 50 from the output of the final delay circuit 32 in the delay line 27 which reset the complementing flip-flop 28.

Figure 7:
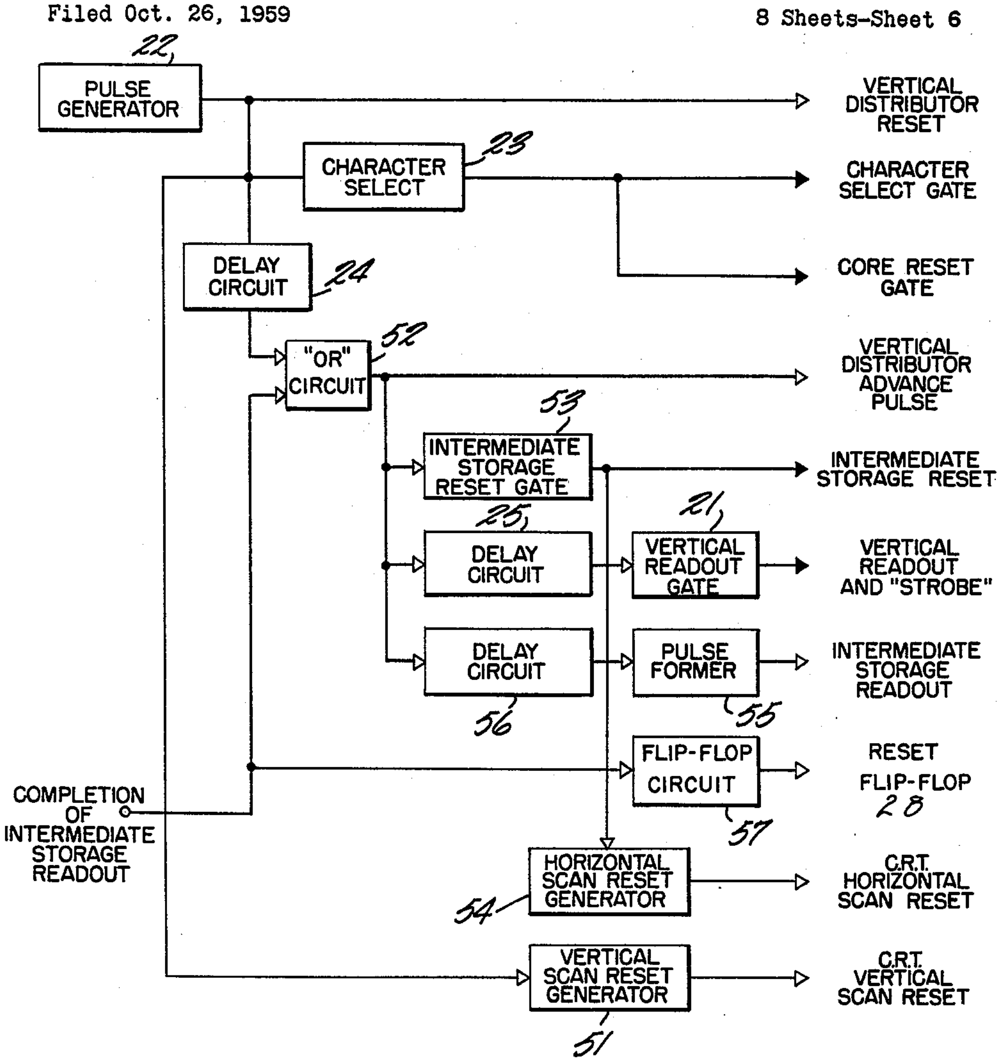
FIG. 7 is a block diagram illustrating the timing logic of the system shown in FIG. 4.
Figure 8:
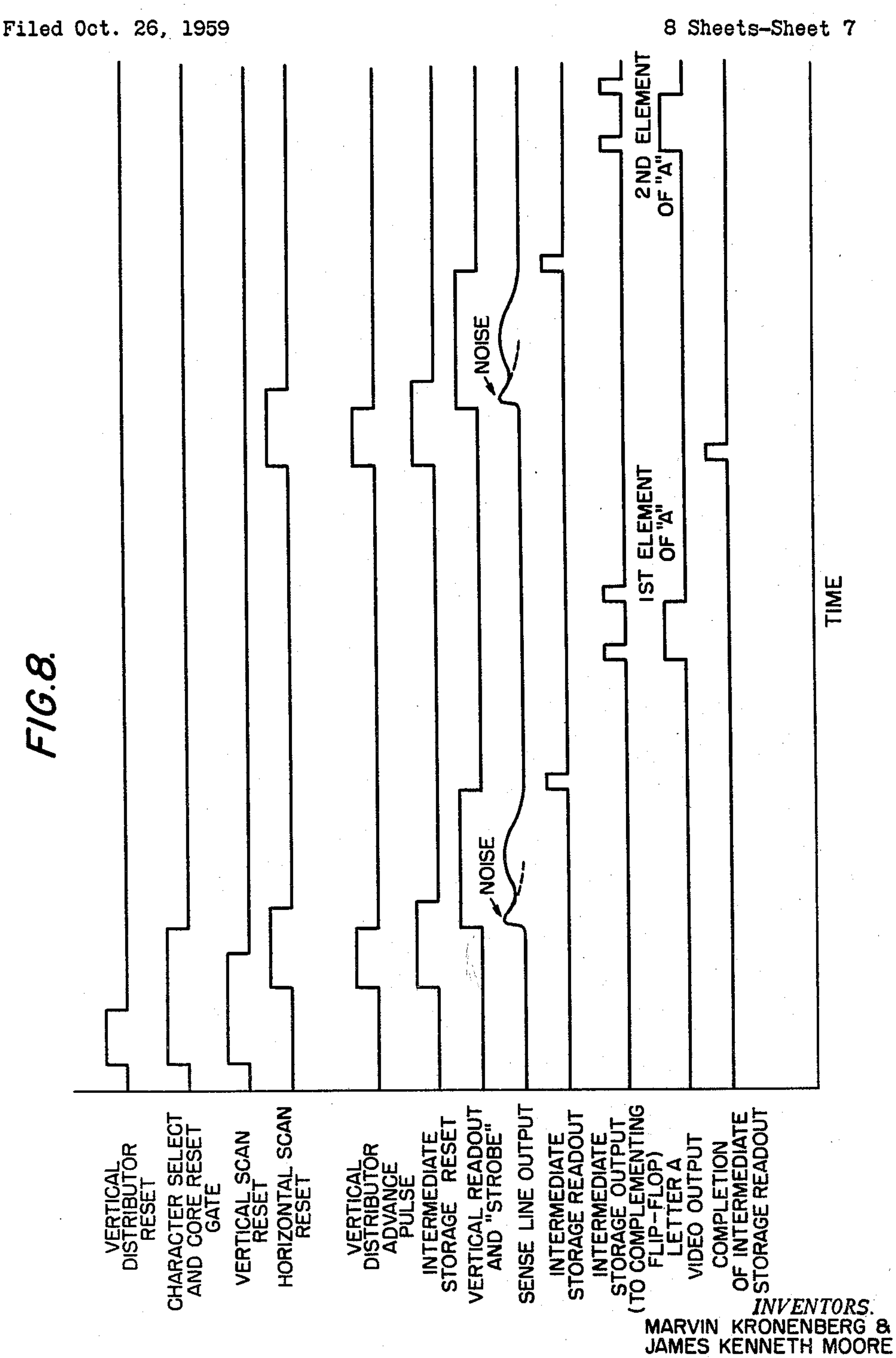
FIG. 8 is a timing diagram of the control pulses involved in the apparatus of FIG. 4.

The invention may be more completely understood from the schedule of waveforms shown in FIG. 8 and the control pulse generating circuitry shown in FIG. 7. At the beginning of a cycle, the pulse generator 22 generates a pulse which is received by the reset input of the vertical distributor 19 (FIG. 4) and places the distributor in the reset position. This pulse is also fed directly to the vertical scan reset generator 51 (FIG. 7) which sets the scan generator of the cathode ray tube at the beginning of its cycle. This pulse also resets all of the cores in the matrix selected.

The delay circuit 24 delays the pulse until the functions have ben completed and then passes it through an "or" circuit 52 and advances the vertical distributor 19 to the first horizontal wire 10 of the matrix selected (FIG. 4). The pulse also passes through an intermediate storage reset gate 53 which simultaneously resets the storage elements 29 (FIG. 6) and resets the horizontal scan generator 54 of the cathode ray tube. The pulse passing through the gate 52 is again delayed by the circuit 25 and generates a vertical readout pulse.

After a horizontal wire in the core matrix has been readout, the pulse from the "or" circuit 52 passes to a pulse forming circuit 55 from another delay circuit 56 and generates an intermediate storage readout pulse. Each storage element 29 (FIG. 6) is sampled by this pulse and the complementing flip-flop circuit 28 produces a square wave video output pulse which is fed to the brightness control grid on the cathode ray tube.

When the intermediate storage readout pulse leaves the final delay circuit 32 (FIG. 6), the pulse is fed into a flip-flop circuit 57 which generates a signal that resets the flip-flop circuit 28. The pulse from the delay circuit 32 also passes through the circuit 52 and advances the vertical distributor 19 to the next horizontal wire in the core matrix. A series of events similar to those previously described then repeats for each horizontal line in the matrix as the storage elements 29 (FIG. 6) are reset to their "zero" state, a vertical readout pulse is applied to the horizontal wires, etc.

Figure 9:
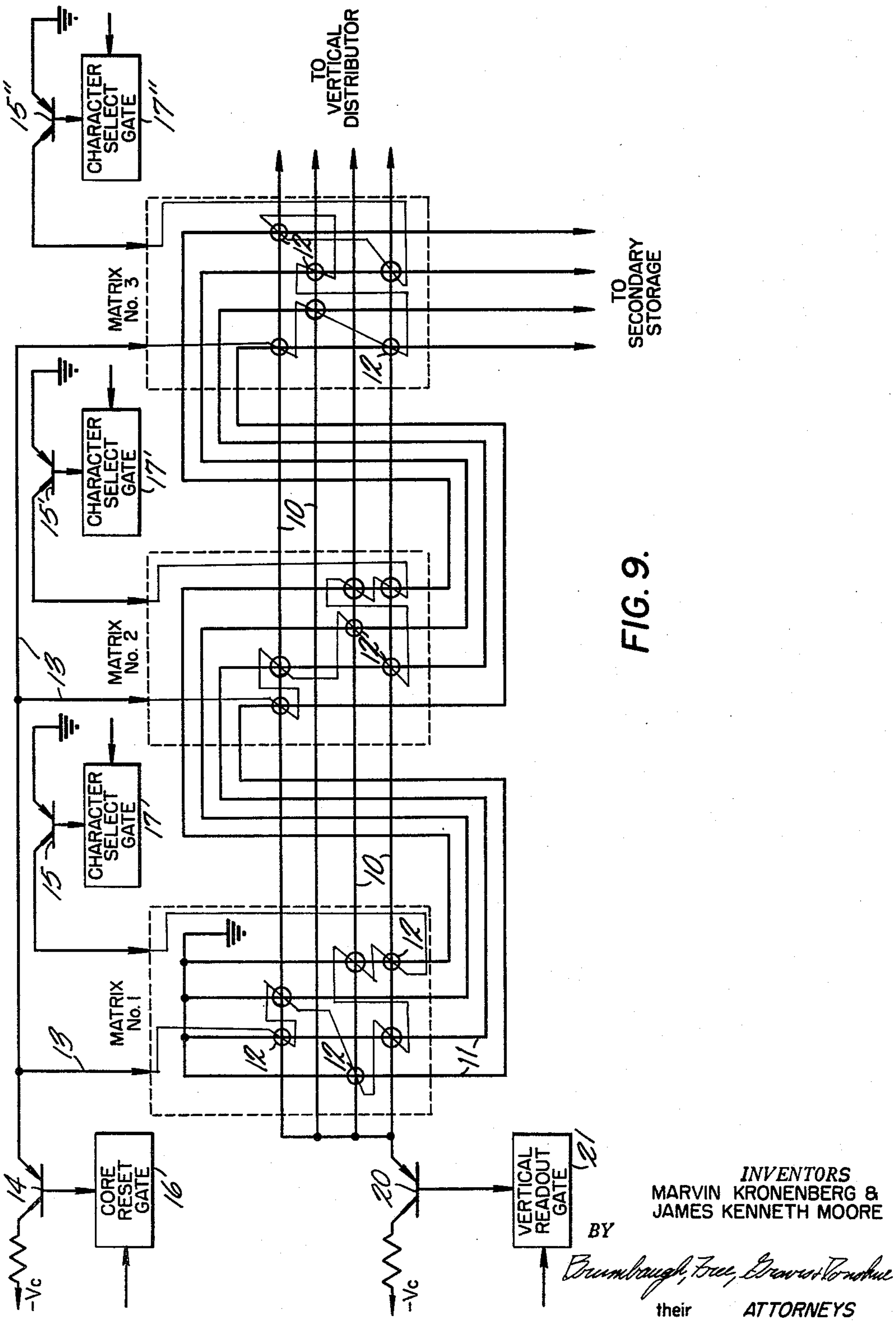
FIG. 9 is a schematic diagram illustrating a system for displaying selectively a plurality of characters according to the invention.

While the invention has been described as employing a single matrix designed to generate the single character "A" on the cathode ray tube, it is readily apparent that by providing a plurality of matrices a variety of different characters can be displayed. When adding additional matrices, it is only necessary to duplicate the portion of the circuit that is included in the dashed lines shown in FIG. 2 for each matrix. This is illustrated in FIG. 9 wherein three elementary matrices are coupled together. The horizontal wires 10 in each matrix are connected together in series and are connected at one end to the transistor 20 and to the vertical readout gate 21, while the other end is connected to the vertical distributor. The vertical sense lines 11 are also connected in series and have one end grounded and the other end connected to the secondary storage. The matrices, the reset lines 13, the transistors 15 and the means to saturate the transistors 15 are the only portions that have to be duplicated. It should be understood that the elementary matrices shown in FIG. 9 having only four vertical and horizontal wires are for purposes of illustration only, since a matrix will ordinarily have many more wires, the exact number depending on the resolution desired. Provision can be made for either electronically or mechanically selecting the matrix that is to be connected into the circuit and, therefore, the particular character to be displayed. Thus, electrical or mechanical character representing signals from the output of a computer, for example, could be used to select characters to be displayed.

Any means that will display a two dimensional symbol can be employed to display the characters instead of a cathode ray tube. For example, a moving galvanometer mirror and means to blank the light beam could be used. As a further example, an electrographic printing apparatus could be employed.

While a representative embodiment has been shown and described for purposes of illustration, changes and modifications may be made without departing from this invention in its broader aspects. Therefore, the invention is not to be construed as limited to the specific embodiment described but is intended to encompass all modifications thereof coming within the scope of the following claims.

We claim:

1. In a high speed data displaying system for generating a pattern on a cathode ray tube in the form of a plurality of generally parallel, closely spaced continuous line segments of selectively variable length, the combination of primary storage means that includes a plurality of intersecting first and second conductors and a plurality of memory elements, said memory elements being geometrically arranged only at intersections of said conductors corresponding to the ends of the line segments of the pattern to be generated, means connected to said first conductors for energizing said memory elements in such a manner that they cause signals to appear on said second conductors, secondary storage means connected to said second conductors which is adapted to store simultaneously signals received therefrom, converting means connected to said secondary storage means which is adapted to convert signals stored on said secondary storage means sequentially to pulses of variable length for controlling the intensity of the beam on a cathode ray tube, vertical and horizontal scan generators for said cathode ray tube, and synchronizing means connecting said primary and secondary storage means and said converting means to the vertical and horizontal scan generators of said cathode ray tube.

2. In a high speed data displaying system for generating a pattern on a cathode ray tube in the form of a plurality of generally parallel, closely spaced continuous line segments of selectively variable length, the combination of primary storage means that includes a plurality of intersecting first and second conductors and a plurality of magnetic cores, said magnetic cores being inductively coupled with said first and second conductors only at intersections corresponding to the ends of the line segments of the pattern to be generated, means coupled to each of said cores for placing said cores in a first state, means connected to said first conductors for causing current to flow through successive ones of said first conductors, said cores being adapted when current flows through said first conductors to shift from the first state to a second state and induce signals on said second conductors, secondary storage means connected to said second conductors, said secondary storage means including a plurality of storage elements that are connected to different ones of said second conductors and are adapted to simultaneously store signals received therefrom, converting means connected to said storage elements for sampling the same sequentially to determine whether said storage elements have signals stored thereon and for producing sequential pulses of variable length for controlling the intensity of the beam of the cathode ray tube, vertical and horizontal scan generators for said cathode ray tube, and synchronizing means connecting said primary and secondary storage means and said converting means to the vertical and horizontal scan generators of said cathode ray tube.

3. In a high speed data displaying system for generating a pattern on a cathode ray tube in the form of a plurality of generally parallel, closely spaced continuous line segments of selectively variable length, the combination of primary storage means that includes a plurality of intersecting first and second conductors and a plurality of memory elements, said memory elements being inductively coupled with said first and second conductors and being geometrically arranged only at intersections of said conductors corresponding to the ends of the line segments of the pattern to be generated, distributor means connected to said first conductors which is adapted to pass current through successive ones of said first conductors each time said distributor is energized, pulse generator means adapted to periodically energize said distributor, means responsive to said pulse generator means for periodically placing said memory elements in a first state, said memory elements being adapted to transfer from their first state to a second state and simultaneously induce signals on said second conductors when said distributor passes current through said first conductors, converting means responsive to said signal simultaneously induced on said second conductors for generating sequential signals representative of said geometrical arrangement of the said memory elements for controlling the intensity of the beam of a cathode ray tube, vertical and horizontal scan generators for said cathode ray tube, and means for synchronizing said distributor means and said converting means with the horizontal and vertical scan generators of the cathode ray tube.

4. In a system for displaying reproductions of characters in the form of a plurality of generally parallel, closely spaced continuous line segments of selectively variable length on a display device, the combination of primary character representing storage means adapted when energized to generate signals representative of the ends only of each of said line segments, means for periodically energizing said primary storage means, means for effecting a scanning operation to generate a raster on said display device, and means responsive to said signals from said primary storage means for generating within said raster the plurality of generally parallel, closely spaced continuous line segments having lengths determined by said signals to reproduce the character represented by said primary storage means.

5. In a system for displaying reproductions of characters in the form of a plurality of generally parallel, closely spaced continuous line segments of selectively variable length on a display device, the combination of a plurality of primary storage means, each of said primary storage means representing a character and adapted when energized to generate signals representative of the ends only of each of the line segments of its respective character, means for selecting one of said primary storage means, means for repetitively energizing said selected one of said primary storage means, means for effecting a scanning operation to generate a raster on said display device, and means responsive to said signals from said selected primary storage means for generating within said raster the plurality of generally parallel, closely spaced continuous line segments having lengths determined by said signals to reproduce the character represented by said selected primary storage means.

6. In a system for displaying reproductions of characters in the form of a plurality of generally parallel, closely spaced continuous line segments of selectively variable length on a display device, the combination of a matrix of intersecting conductors, a plurality of signal responsive devices disposed one at each intersection of said matrix corresponding to an end of one of said line segments, whereby two of such signal responsive devices establish each of said line segments, means supplying signals successively to the conductors of said matrix extending in a given direction, means for sensing the condition of said signal responsive devices, means for generating a scanning motion in synchronism with said sensing operation to provide a raster, and means responsive to the sensed conditions of said signal responsive devices for generating within said raster the plurality of generally parallel, closely spaced continuous line segments having lengths determined by said signals to form a reproduction of the character for display.

7. A system according to claim 6 wherein said means for sensing conditions of the signal responsive devices includes storage means for simultaneously storing indications of the conditions of all of the devices affected by each of said successively applied signals, and means to read out said storage means sequentially in synchronism with said scanning motion.

8. A system according to claim 7 wherein said display device is a cathode ray tube and the output of said storage means is in the form of pulses that successively turn the beam of the tube on and off.

9. A system according to claim 6 further comprising a plurality of matrices, each corresponding to a different character, and means for selecting any one of said matrices to be operative at a given time.

References Cited in the file of this patent

UNITED STATES PATENTS

| | | |
|---|---|---|
| 2,820,956 | Rueger | Jan. 21, 1958 |
| 2,920,312 | Gordon et al. | Jan. 5, 1960 |